(12) United States Patent
Kang et al.

(10) Patent No.: US 11,968,371 B2
(45) Date of Patent: Apr. 23, 2024

(54) BLOCK VECTOR ESTIMATION METHOD FOR MULTIVIEW VIDEO BASED ON INTRA BLOCK COPY AND DECODER

(71) Applicant: Korea Electronics Technology Institute, Seongnam-si (KR)

(72) Inventors: Je Won Kang, Seoul (KR); Eun Yeo, Incheon (KR); Yong Hwan Kim, Anyang-si (KR); Ji Eon Kim, Seoul (KR)

(73) Assignee: KOREA ELECTRONICS TECHNOLOGY INSTITUTE, Seongnam-si (KR)

(*) Notice: Subject to any disclaimer, the term of this patent is extended or adjusted under 35 U.S.C. 154(b) by 128 days.

(21) Appl. No.: 17/534,988

(22) Filed: Nov. 24, 2021

(65) Prior Publication Data

US 2022/0166984 A1 May 26, 2022

(30) Foreign Application Priority Data

Nov. 24, 2020 (KR) .................. 10-2020-0159306

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11); *H04N 19/597* (2014.11)

(58) Field of Classification Search
CPC .. H04N 19/137; H04N 19/105; H04N 19/159; H04N 19/176; H04N 19/597
See application file for complete search history.

(56) References Cited

U.S. PATENT DOCUMENTS

2015/0261884 A1* 9/2015 Pang ...................... H04N 19/30
707/741
2016/0269751 A1 9/2016 Zhang et al.
(Continued)

OTHER PUBLICATIONS

Je-Won Kang, "Disparity Vector Derivation Method for Texture-Video-First-Coding Modes of 3D Video Coding Standards", The Journal of Korean Institute of Communications and Information Sciences, 15-10 vol. 40 No. 10, Cited in NPL No. 1, with English Abstract.

(Continued)

*Primary Examiner* — Francis Geroleo
(74) *Attorney, Agent, or Firm* — Hauptman Ham, LLP

(57) ABSTRACT

Disclosed is a method of predicting a block vector in a multi-view image, the method including allowing an encoder to determine a reference block of a reference image for a specific block of a depth image or a specific-view image among multi-view images, allowing the encoder to determine block vector information for intra block copy (IBC) of the specific block on the basis of a block vector of the reference block when the reference block is encoded using the IBC, and allowing the encoder to encode the block vector information of the specific block. The reference image of the specific view is an image of another view, and the reference image of the depth image is a texture image corresponding to the depth image.

6 Claims, 8 Drawing Sheets

(51) Int. Cl.
*H04N 19/159* (2014.01)
*H04N 19/176* (2014.01)
*H04N 19/597* (2014.01)

(56) References Cited

U.S. PATENT DOCUMENTS

2019/0082184 A1* 3/2019 Hannuksela ............ H04N 13/15
2020/0260113 A1* 8/2020 Han ........................ H04N 19/52

OTHER PUBLICATIONS

Christian Bartnik et al., "HEVC Extension for Multiview Video Coding and Multiview Video plus Depth Coding", 43 VCEG meeting, 97 MPEG meeting, VCEG-AR13, Feb. 2012, Cited in NPL No. 1.
Wenbin Yin et al., "History Based Block Vector Predictor for Intra Block Copy", 2020 IEEE International Conference on Multimedia & Expo Workshops (ICMEW), Cited in NPL No. 1.
Office Action issued for corresponding Korean Patent Application No. 10-2020-0159306 dated Oct. 19, 2021, with English translation.
Je-Won Kang, "Disparity Vector Derivation Method for Texture-Video-First-Coding Modes of 3D Video Coding Standards", The Journal of Korean Institute of Communications and Information Sciences, 15-10 vol. 40 No. 10, with English translation.

\* cited by examiner

** # BLOCK VECTOR ESTIMATION METHOD FOR MULTIVIEW VIDEO BASED ON INTRA BLOCK COPY AND DECODER

CROSS-REFERENCE TO RELATED APPLICATION

This application claims the benefit under 35 U.S.C. § 119(a) of Korean Patent Application No. 10-2020-0159306, filed on Nov. 24, 2020, in the Korean Intellectual Property Office, the entire disclosure of which is incorporated herein by reference for all purposes.

BACKGROUND

1. Field of the Invention

The following description relates to an inter-image prediction technique using intra block copy (IBC) in a multi-view image.

2. Discussion of Related Art

Three-dimensional (3D) multi-view images provide hierarchically various services using images from multiple viewpoints. 3D multi-view images are serviced using a multi-view video plus depth (MVD) format. Multi-view images may be divided into independent views and dependent views. An image of a dependent view may be encoded using information of an independent view. Also, each of the 3D multi-view images includes a texture image, which is a basic image, and a depth image, which has depth information. Since a texture image and a depth image are associated, one image may be encoded with reference to another image.

SUMMARY OF THE INVENTION

A multi-view image is composed of multiple views and has a larger capacity than general videos. Therefore, an effective coding technique for multi-view images is required. The following description is directed to providing an intra-block copy (IBC)-based encoding technique using images of different views and/or different layered images in a 3D multi-view image.

According to an aspect of the present disclosure, there is provided a method of predicting a block vector in a multi-view image using intra-block copy (IBC), the method including allowing an encoder to determine a disparity vector for a specific block of a specific-view image among multi-view images, allowing the encoder to determine a reference block of one reference image that has been coded among the multi-view images using the disparity vector, allowing the encoder to determine block vector information for the IBC of the specific block on the basis of a first block vector of the reference block when the reference block is encoded using the IBC, and allowing the encoder to encode the block vector information of the specific block.

According to another aspect of the present disclosure, there is provided a multi-view image decoder using intra block copy (IBC), the multi-view image decoder including an input device configured to receive a bitstream for multi-view images, a storage device configured to store a program for performing IBC-based intra-prediction, and a computing device configured to extract block vector information for a specific block from the bitstream, determine a target block used to encode the specific block using the block vector information, and decode the specific block using the target block.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF EXEMPLARY EMBODIMENTS

As the following description may be variously modified and have several example embodiments, specific embodiments will be shown in the accompanying drawings and described in detail below. It should be understood, however, that there is no intent to limit the following description to the particular forms disclosed, but on the contrary, the following description is to cover all modifications, equivalents, and alternatives falling within the spirit and scope of the invention.

In addition, the terms such as "first," "second," "A," and "B" may be used to describe various elements, but these elements are not limited by these terms. These terms are used to only distinguish one element from another element. For example, a first element may be called a second element, and a second element may also be called a first element without departing from the scope of the following description. The term "and/or" means any one or a combination of a plurality of related items.

It should be understood that singular forms are intended to include plural forms unless the context clearly indicates otherwise, and it should be further understood that the term "comprise," "include," or "have" as used herein specify the presence of stated features, numerals, steps, operations, elements, components, or a combination thereof, but do not preclude the presence or addition of one or more other features, numerals, steps, operations, elements, components, or combinations thereof.

Prior to a detailed description of the drawings, it should be clarified that division of components in the present specification is merely performed based on main functions performed by the respective components. That is, two or more components which will be described later may be integrated into a single component or, alternatively, a single component may be divided into two or more components depending on subdivided functions. Further, it is apparent that each of the components, which will be described later, may additionally perform some or all of the functions performed by other components in addition to main functions performed thereby, and some of the main functions performed by the respective components may be shared with other components and may be performed.

In addition, the respective steps of the above method may be performed in a sequence different from a described sequence unless the context clearly defines a specific sequence. That is, the respective steps may be performed in the same order as described, substantially simultaneously, or in reverse order.

Figure 1:
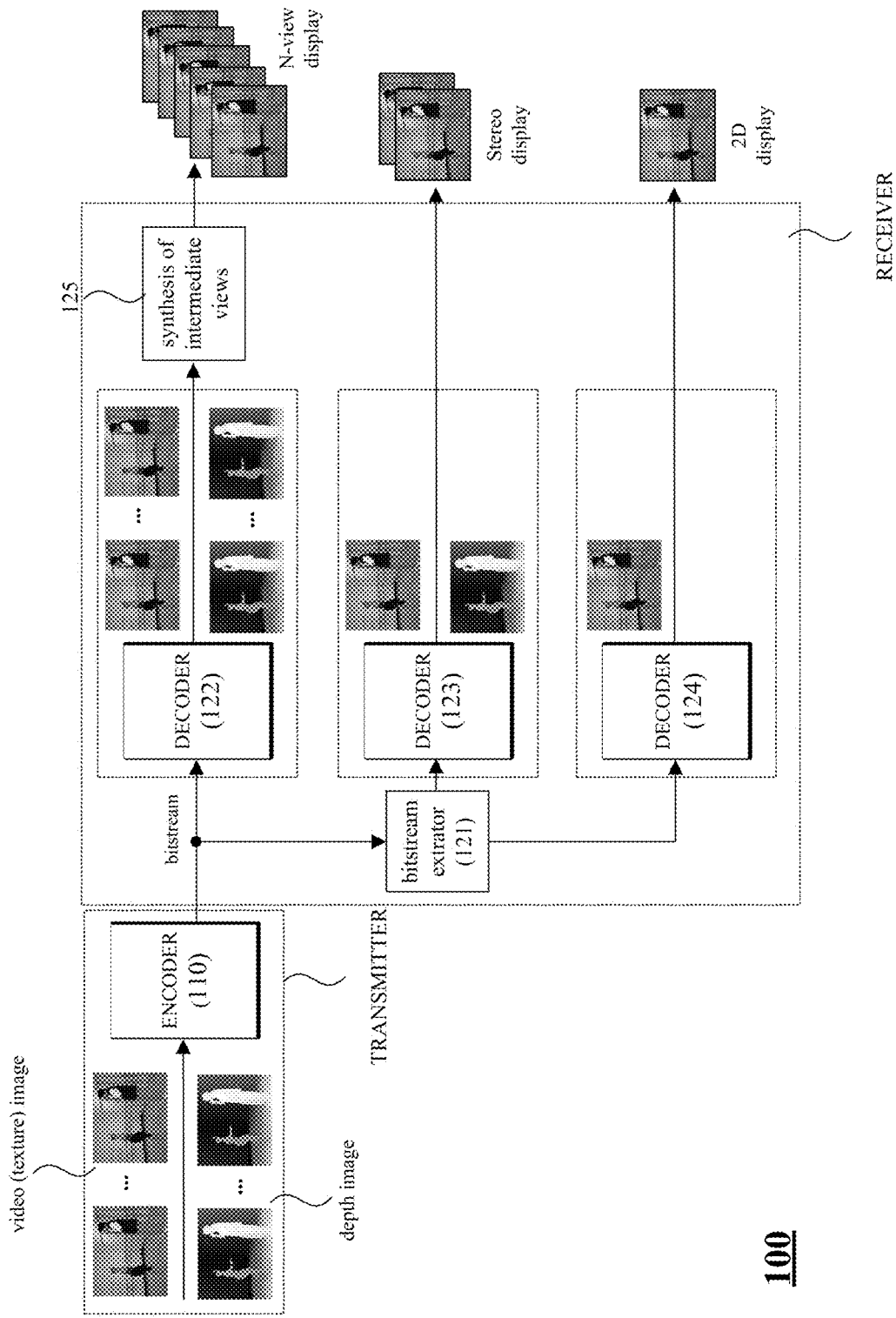
FIG. 1 is an example of a multi-view video system.

FIG. 1 is an example of a multi-view video system 100. A source image includes multiple view images, and each image is composed of a texture image and a depth image. An encoder 110 on the transmitter side encodes the source image. A transmitter transmits an encoded bitstream. A bitstream packet includes parameters related to video compression, an identifier of each view, and header information indicating whether to include texture data or depth data. The parameters may include information for synthesizing different views.

A receiver may receive the bitstream and provide various images according to the service purpose.

A decoder 122 decodes a three-dimensional (3D) multi-view image. The decoder 122 decodes the texture image and the depth image for each of the multiple views included in the received bitstream.

A synthesizer 125 may synthesize an additional intermediate view using a depth image-based rendering technique on the basis of some of the multiple images decoded by the decoder 122.

The receiver provides an N-view image using an intermediate view image generated by the synthesizer 125 and the images decoded by the decoder 122. For example, a user may receive a 3D image on the basis of a moving view using a head-mounted display device.

An extractor 121 extracts a necessary bitstream (some data) from the received bitstream. A decoder 123 decodes the texture image and the depth image for a specific view for a two-dimensional (2D) stereo image. A decoder 124 decodes a texture image at a specific view for a 2D image.

Figure 2:
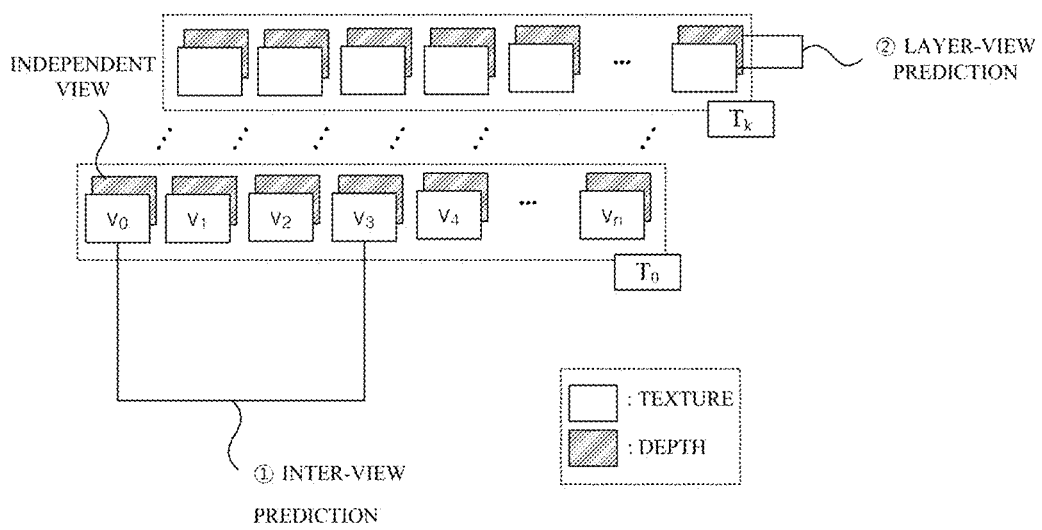
FIG. 2 is an example illustrating a case in which inter-image prediction is possible in a multi-view video.

FIG. 2 is an example illustrating a case in which inter-image prediction is possible in a multi-view video.

Each view constituting a multi-view image is classified into an independent view or a dependent view. There exists at least one independent view. The independent view is encoded using only the information of the current view without using information of an adjacent view. That is, the independent view is compressed by performing predictive encoding between times. The dependent view may be encoded by utilizing the information of the independent view. The encoding scheme is referred to as predictive encoding between views. The independent view and the dependent view are identified by an identifier for a view.

FIG. 2 illustrates a total of n+1 multi-view images. Each of the multi-view images is composed of k+1 frames on the time axis. It is assumed that v0 is an independent view and the remaining v1 to vn are dependent views. v0 may be encoded using information of its own other frame without using a different view image. The dependent view may be encoded by utilizing the independent view. For example, v3 may be predictively encoded between views using information of v0.

Each view image may be composed of a texture image and a depth image. The texture image includes RGB data and the depth image includes 3D structure information (depth information). The texture image and the depth image have the same view (an index of the same view). In the case of an independent view, the texture image is always encoded earlier than the corresponding depth image. However, the dependent view may be encoded before or after the depth image having the same view index as the texture image.

A specific view image is composed of a texture image and a depth image. For convenience of description, it is assumed that the texture image and the depth image are images of different layers. That is, a specific view image is composed of a layered image, and the layered image includes a texture image and a depth image. Inter-layer predictive encoding may be performed between the texture image and the depth image in encoding order. For example, when the texture image is encoded first, the depth image may be encoded with reference to (by performing inter-layer prediction on) information used to encode the corresponding texture image. Furthermore, when the depth image is encoded first, the texture image may be encoded with reference to information used to encode the corresponding depth image. For example, in the Tk frame in FIG. 2, for Vn, the texture image may be encoded with reference to the depth image, or the depth image may be encoded with reference to the texture image according to the encoding order.

Inter-view prediction encoding will be described.

There is disparity compensated prediction (DCP) as an example of the inter-view prediction encoding. DCP refers to a method of transmitting only a residual by using a block in an adjacent view as a predictive block as in the conventional motion compensated prediction (MCP). The prediction vector used for DCP is referred to as an inter-view motion vector.

In the process of performing prediction between views, it is sometimes necessary to find which block or region the block of the current view corresponds to in an adjacent view. A vector used for such correspondence is referred to as a disparity vector (DV).

DV can be found in two main ways.

The first method is a neighboring block-based disparity vector (NBDV). NBDV is used when a texture image is encoded earlier than a depth image. DV is estimated by looking at the neighboring block of the current block and using the inter-view motion vector of a DCP block that has been encoded. The current block has adjacent blocks in space and/or time. When at least one of the adjacent blocks uses an inter-view motion vector, the vector is used as the DV of the current block.

The second method is a method based on depth information. For example, when a depth image is encoded, a DV may be found by using, as depth information, the distance between pixel x1 of the current view and pixel x0 of an adjacent view, as shown in Equation 1 below. In Equation 1, f denotes camera focal length, c denotes distance between cameras, and d denotes depth information.

$$d_v = x_0 - x_1 = \frac{f}{d_q} \times c \qquad \text{[Equation 1]}$$

The following description uses the IBC technique for inter-view prediction. The IBC will be briefly described. The IBC, which is discussed in versatile video coding (VVC), is an intra-prediction technique.

An encoder finds a block most similar to a coding unit (CU) to be encoded through block matching and then finds a vector indicating its spatial location. The vector is referred to as a block vector (BV). The block vector represents the spatial displacement from the current block to a reference block. The reference block refers to a block composed of reference samples that have already been encoded and that can be referenced by the encoder to encode the current block.

The IBC sends a flag at the CU level to indicate whether it is used or not. The IBC has two modes. An IBC skip/merge mode or an IBC advanced motion vector prediction (AMVP) mode is used.

(1) In the IBC skip/merge mode, the current block is predicted using a merge mode index, and when a neighboring block is encoded with IBC, a corresponding block vector is transmitted. The IBC skip/merge mode is a mode for signaling, as a corresponding index of a merge candidate, which of the BVs of the adjacent candidate blocks encoded in the IBC mode is used as the BV of the current CU. In this case, the merge list is composed of a space, history-based motion vector prediction (HMVP), and pairwise candidate.

(2) In the IBC AMVP mode, the difference between BVs is encoded in the same way as the motion vector difference is encoded. In this case, when a left neighboring block and an upper neighboring block are encoded with the IBC, the block vector prediction method uses the corresponding block vector as a prediction vector. In this case, a BV prediction candidate uses the BVs of the left neighbor and the upper neighbor encoded with IBC, and when there is no neighbor that satisfies the IBC conditions, a default BV is used. The selected BV is signaled as flag information.

Figure 3:
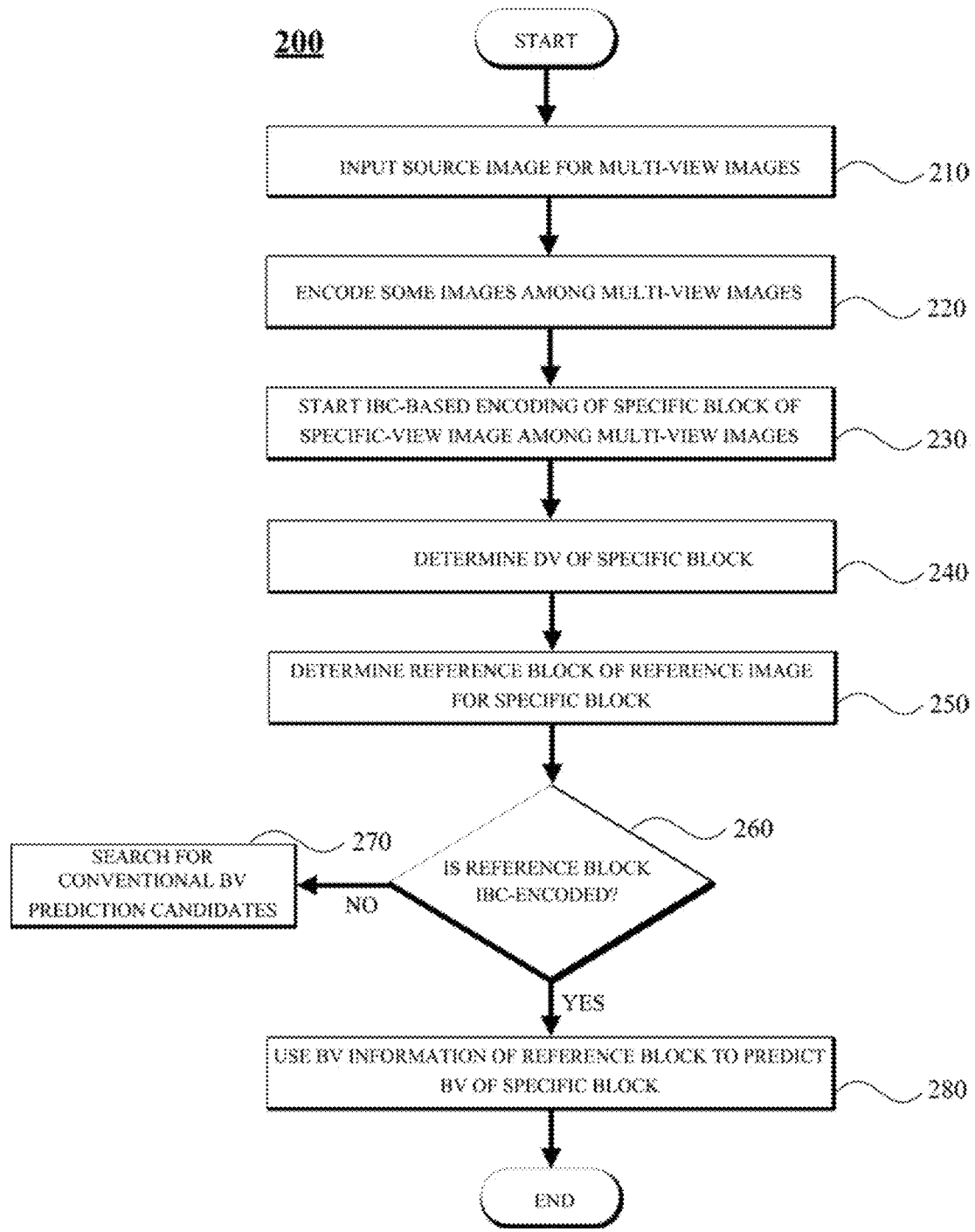
FIG. 3 is an example illustrating a process of predicting an inter-view intra block copy (IBC) block vector in a multi-view video.

FIG. 3 is an example illustrating a process 200 of predicting an inter-view IBC block vector in a multi-view video. FIG. 3 is an example illustrating a process of an encoder predicting an inter-view IBC block vector. FIG. 3 corresponds to a process of an encoder performing IBC-based encoding on a specific block. The specific block is a block included in the current image. An encoder finds a block vector for the specific block in an image of a different view. The encoder determines a block vector of the specific block using a block vector of an IBC encoded block in another image.

The encoder receives a source image for multi-view images (210). The encoder completes encoding of some of the multi-view images (220).

Now, the encoder is to encode an image of a specific view among the multi-view images. The encoder is to perform IBC-based encoding on a specific block of a specific-view image (230). In this case, the specific-view image may be a dependent-view image.

The encoder determines the DV of the specific block (240). The DV may be determined by the above-described method. The encoder determines a reference block of a reference image for the specific block on the basis of the DV (250). The reference image is an image that has been encoded among the multi-view images. The reference image may be an independent-view image or a dependent-view image.

The encoder checks whether the reference block is encoded using IBC (260). When the reference block is not encoded using IBC (NO in 260), the encoder searches for a candidate according to a conventional BV prediction technique (270).

When the reference block is encoded using IBC (YES in 260), the encoder uses BV information of the reference block to predict the IBC block vector of the specific block (280).

In another embodiment, the encoder checks whether spatially and temporally adjacent blocks of the reference block are encoded using IBC, and then when the adjacent blocks are encoded using IBC, the encoder may use BV information of the reference block to predict the specific block (280).

An example of determining the IBC block vector (cBV) of the specific block will be described as an example.

(1) The encoder may use the BV (pBV) of a reference block as the BV (cBV) of a specific block.

(2) The encoder may predict the BV (cBV) of the specific block on the basis of the BV (pBV) of a reference block. For example, the encoder may determine cBV by finding a target block determined based on pBV and a block matched to a specific block among blocks adjacent to the target block.

In this case, the encoder may encode and transmit (i) pBV, (ii) cBV, or (iii) dBV=cBV−pBV (difference between block vectors).

(3) The encoder may add pBV, as a candidate, to a traditional BV determination process (operation 270) for the specific block. The encoder searches for multiple candidate BV vectors in the IBC AMVP mode or in the IBC skip/merge mode, selects a candidate vector with the highest encoding efficiency from among the vectors, and transmits an index of the candidate vector. In this case, the encoder prepares a candidate vector group by adding pBV to a primary candidate vector determined in the IBC AMVP mode or in the skip/merge mode. That is, the candidate vector group includes a primary candidate vector and pBV. Subsequently, the encoder may determine the candidate vector with the highest encoding efficiency as the candidate vector of the specific vector from among the vectors included in the candidate vector group.

Figure 4:
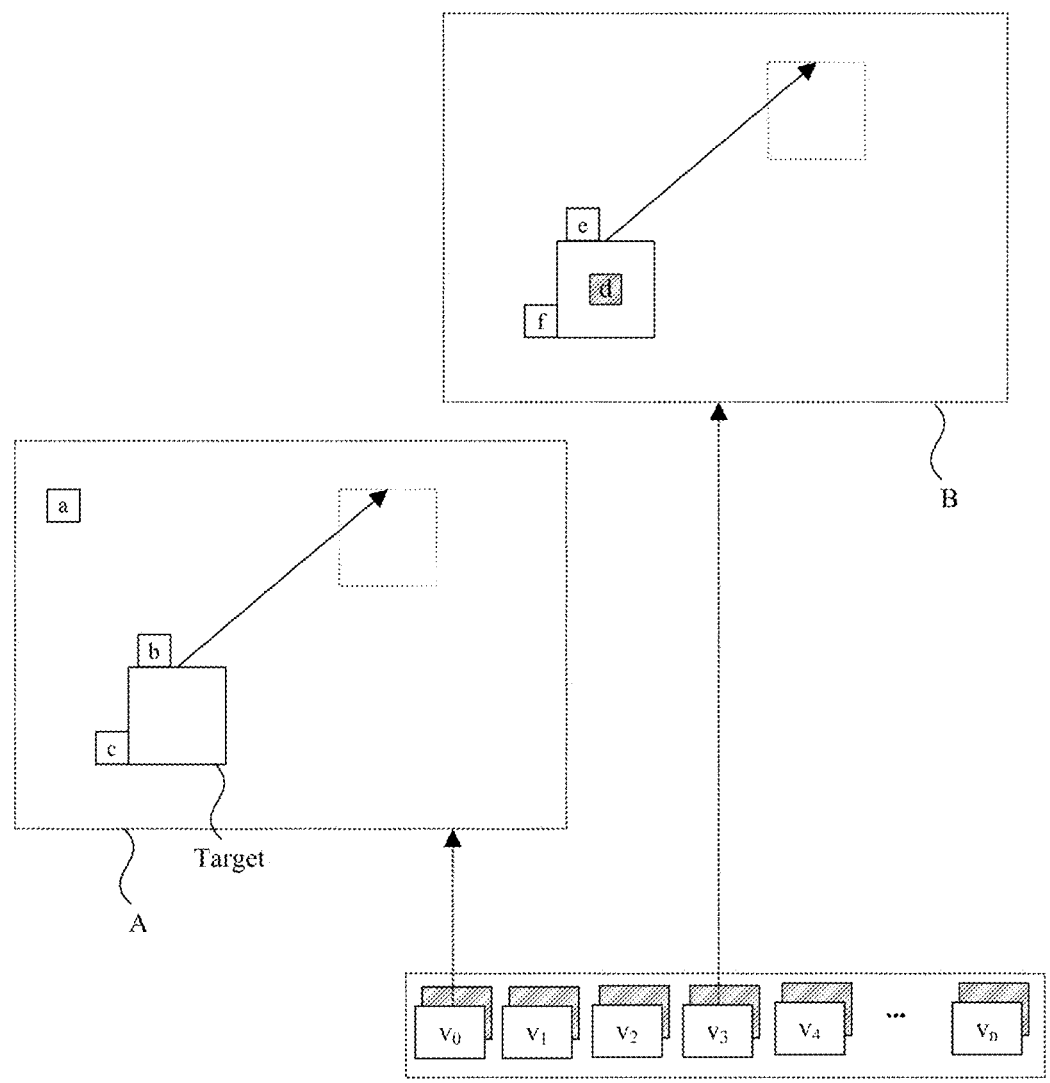
FIG. 4 is an example of a candidate block vector available in inter-view IBC block vector prediction.

FIG. 4 is an example of a candidate block vector available in inter-view IBC block vector prediction. FIG. 4 shows candidate vectors according to the above-described method (3).

In FIG. 4, A is an image of a specific view. For example, A is a dependent-view image. In A, a target is a specific block to be encoded using IBC. In A, a, b, and c are blocks adjacent to the specific block. Also, a, b, and c are block positions for searching for conventional IBC candidate blocks and are spatially adjacent blocks and HMVP candidates with respect to the specific block.

In FIG. 4, B is a reference image. For example, B may be an independent-view image. In B, d is the BV of the reference block found using the DV. e and f are blocks spatially adjacent to the reference block.

The encoder may determine a block vector for the specific block (target) on the basis of a block with the highest encoding efficiency among the candidate blocks a, b, c, d, e, and f.

Meanwhile, inter-view motion vector prediction refers to a method of using a motion vector used in an adjacent view when predicting a motion vector of a current view. When the current block uses the MCP, the encoder may predict the motion vector (MV) of the current block by using the MV that has already been encoded in the adjacent view. The encoder finds the corresponding position of the current block using the DV in the adjacent view first. Then, when there is an MV in the corresponding block, the encoder uses the MV to predictively encode the MV of the current block. In this case, a reference frame index and the like may be predicted together in addition to the value of the MV.

In a conventional motion prediction process of video coding, when a motion vector is encoded, the encoder also encodes motion information associated with the motion vector, such as a reference frame list and a reference frame index. In this case, the encoder may also use motion information associated with the motion vector, such as a reference frame list and a reference frame index related to pBV, for the prediction. Also, the encoder may put pBV as one motion vector prediction candidate in the existing IBC AMVP or IBC merge.

Inter-layer prediction encoding will be described.

Figure 5:
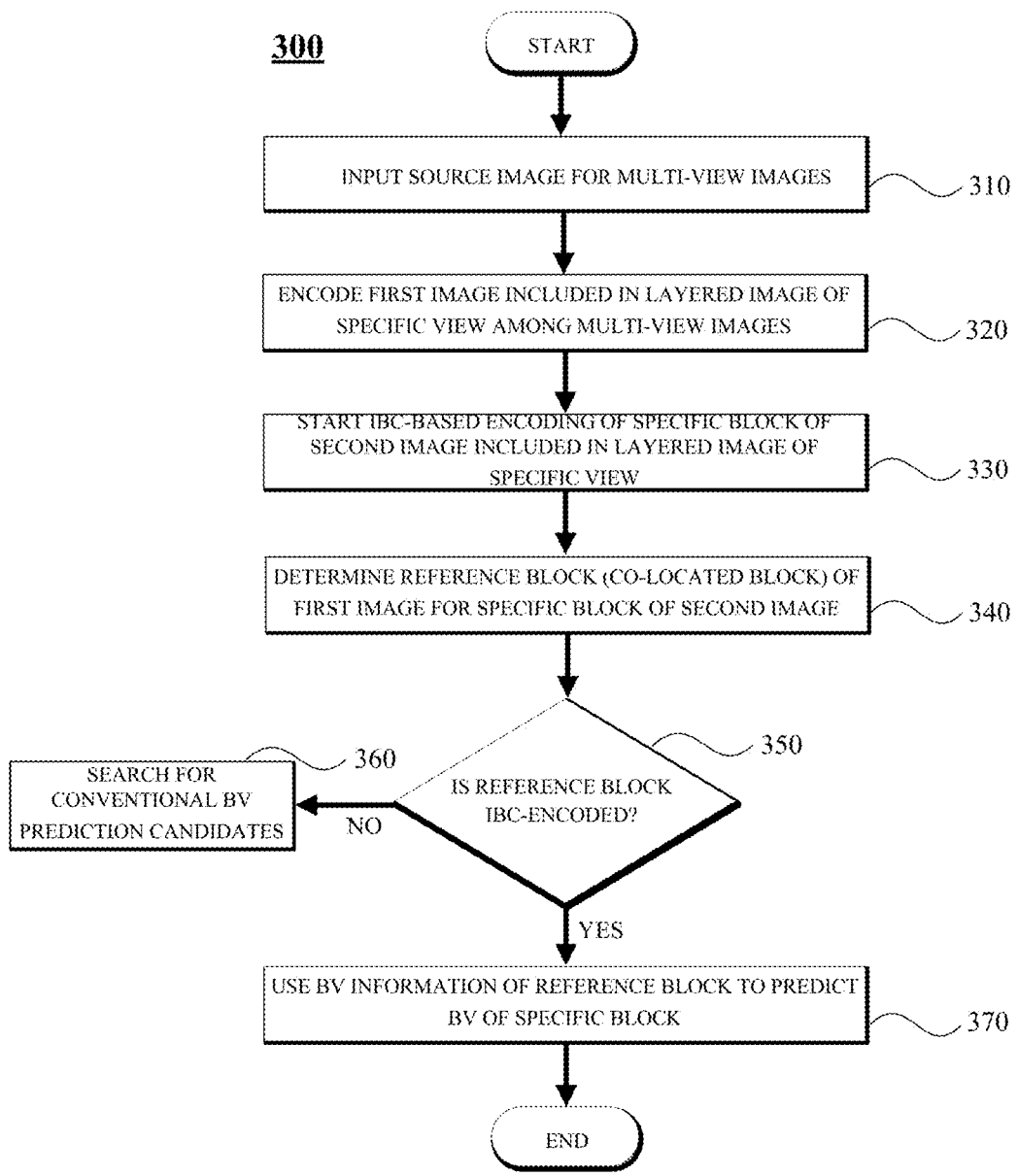
FIG. 5 is an example illustrating a process of predicting an inter-layer IBC block vector in a multi-view video.

FIG. 5 is an example illustrating a process 300 of predicting an inter-layer IBC block vector in a multi-view video. FIG. 5 is an example illustrating a process of an encoder predicting an inter-layer IBC block vector. FIG. 5 corresponds to a process of an encoder performing IBC-based encoding on a specific block. An encoder finds an IBC block vector for a specific block included in a first layered image (texture or depth) in a layered image (depth or texture) different from the first layered image.

The encoder receives a source image for multi-view images (310). The encoder completes encoding of a first image of a layered image of a specific view among the multi-view images (320). The layered image includes a texture image and a depth image. The first image corresponds to the texture image or the depth image.

Now, the encoder is to encode a second image of the layered image of a specific view among the multi-view images. The encoder is to perform IBC-based encoding on a specific block of the second image (330). When the first image is a texture image, the second image is a depth image. When the first image is a depth image, the second image is a texture image.

The encoder determines a reference block (co-located block) of the first image corresponding to the specific block of the second image (340). The reference block may be a block in the same position as that of the specific block. When a texture image has different resolution from a depth image, the encoder may find a corresponding reference block by up-sampling one image to the same size.

The encoder checks whether the reference block is encoded using IBC (350). When the reference block is not encoded using IBC (NO in 350), the encoder searches for a candidate according to a conventional BV prediction technique (360).

When the reference block is encoded using IBC (YES in 350), the encoder uses BV information of the reference block to predict the IBC block vector of the specific block (370).

In another embodiment, the encoder checks whether spatially and temporally adjacent blocks of the reference block are encoded using IBC, and then when the adjacent blocks are encoded using IBC, the encoder may use the BV information of the reference block to predict the specific block (370).

Meanwhile, when a texture image has different resolution from a depth image, the encoder may up-scale or down-scale the BV of the specific block. For example, when the second image is down-sampled, the encoder may down-scale and use the BV at the same ratio with respect to the first image.

An example of determining the IBC block vector (cBV) of the specific block will be described as an example.

(1) The encoder may use the BV (pBV) of a reference block as the BV (cBV) of a specific block.

(2) The encoder may predict the BV (cBV) of the specific block on the basis of the BV (pBV) of a reference block. For example, the encoder may determine cBV by finding a target block determined based on pBV and a block matched to a specific block among blocks adjacent to the target block.

In this case, the encoder may encode and transmit (i) pBV, (ii) cBV, or (iii) dBV=cBV−pBV (difference between block vectors).

(3) The encoder may add pBV, as a candidate, to a traditional BV determination process (operation 270) for the specific block. The encoder searches for multiple candidate BV vectors in the IBC AMVP mode or in the IBC skip/merge mode, selects a candidate vector with the highest encoding efficiency from among the vectors, and transmits an index of the candidate vector. In this case, the encoder prepares a candidate vector group by adding pBV to a primary candidate vector determined in the IBC AMVP mode or in the skip/merge mode. That is, the candidate vector group includes a primary candidate vector and pBV. Subsequently, the encoder may determine the candidate vector with the highest encoding efficiency as the candidate vector of the specific vector from among the vectors included in the candidate vector group.

Figure 6:
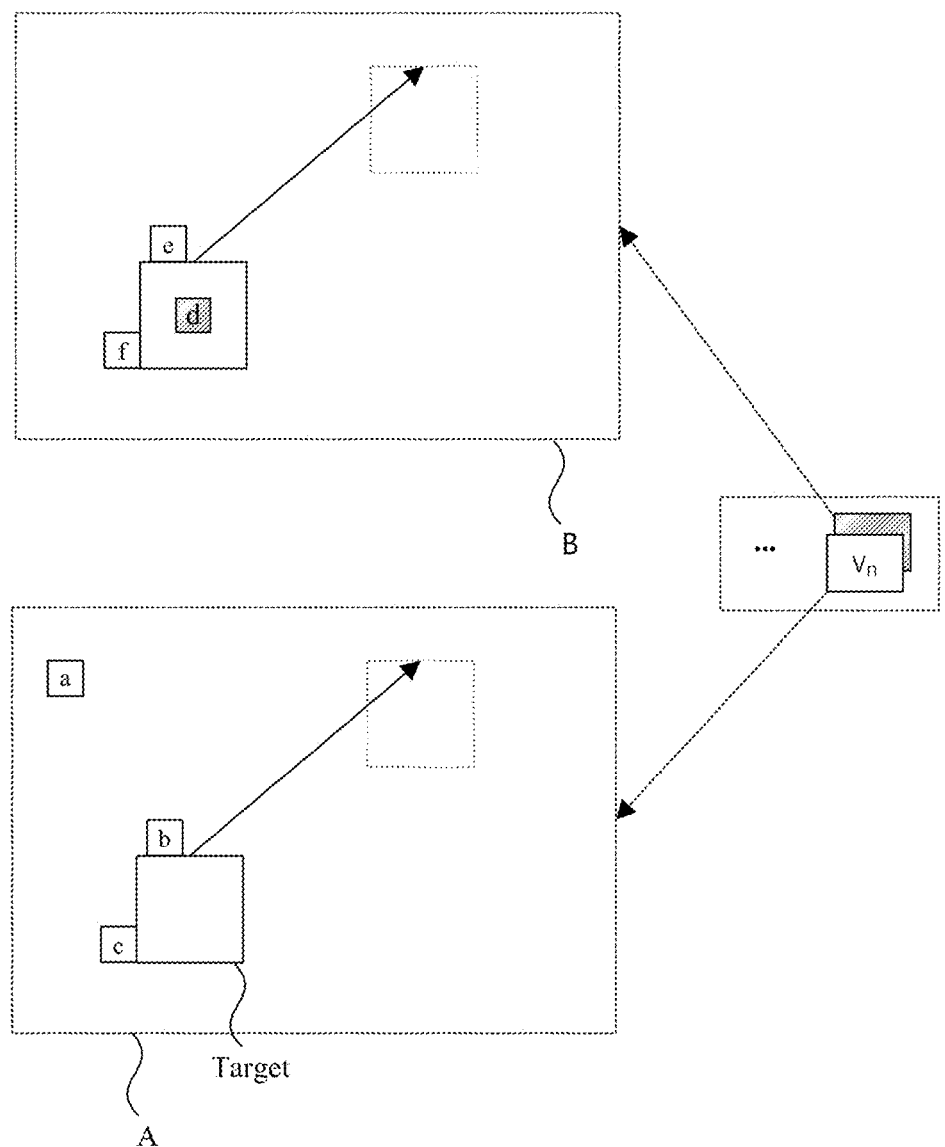
FIG. 6 is an example of a candidate block vector available in an inter-layer IBC block vector.

FIG. 6 is an example of a candidate block vector available in an inter-view IBC block vector. FIG. 6 shows candidate vectors according to the above-described method (3).

In FIG. 6, A is a second image of a specific view to be encoded. For example, A is a depth image. In A, a target is a specific block to be encoded using IBC. In A, a, b, and c are blocks adjacent to the specific block. Also, a, b, and c are block positions for searching for conventional IBC candidate blocks and are spatially adjacent blocks and HMVP candidates with respect to the specific block.

In FIG. 6, B is a reference image. For example, B is a first image of a specific view that has been encoded. B may be a texture image. In B, d is the BV of the reference block found using the DV. e and f are blocks spatially adjacent to the reference block.

The encoder may determine a block vector for the specific block (target) on the basis of a block with the highest encoding efficiency among the candidate blocks a, b, c, d, e, and f.

Meanwhile, inter-view motion vector prediction refers to a method of using a motion vector used in an adjacent view when predicting a motion vector of a current view. When the current block uses the MCP, the encoder may predict the motion vector (MV) of the current block by using the MV that has already been encoded in the adjacent view. The encoder finds the corresponding position of the current block using the DV in the adjacent view first. Then, when there is an MV in the corresponding block, the encoder uses the MV to predictively encode the MV of the current block. In this case, a reference frame index and the like may be predicted together in addition to the value of the MV.

In a conventional motion prediction process of video coding, when a motion vector is encoded, the encoder also encodes motion information the motion vector, such as a reference frame list and a reference frame index. In this case, the encoder may also use motion information associated with the motion vector, such as a reference frame list and a reference frame index related to pBV, for the prediction. Also, the encoder may put pBV as one motion vector prediction candidate in the existing IBC AMVP or IBC merge.

Figure 7:
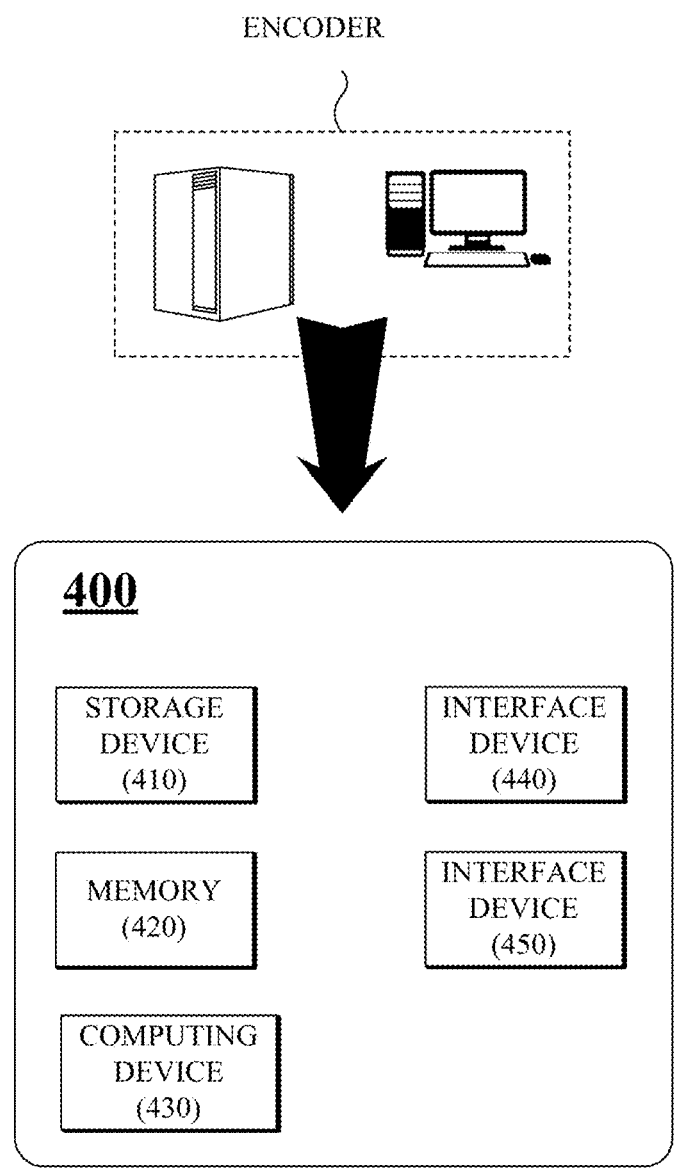
FIG. 7 is an example of an encoder that predicts an IBC block vector.

FIG. 7 is an example of an encoder 400 that predicts an ICB block vector. The encoder 400 may encode a three-dimensional (3D) multi-view image. The encoder 400 may be implemented in the form of a computer device that processes an image, a server, or a chipset that has an embedded encoding program.

The encoder 400 includes a storage device 410, a memory 420, a computing device 430, and an interface device 440. Furthermore, the encoder 400 may include a communication device 450.

The storage device 410 may store a source image.

The storage device 410 may store a program for encoding a multi-view image.

The memory 420 may temporarily store information that is generated or necessary during an encoding process.

The interface device 440 refers to an element for transferring data and commands in the encoder. The interface device 440 may include a physical device and a communication protocol for internal communication. The interface device 440 may receive a source image. The interface device 440 may receive a command for encoding the source image.

The communication device 450 may receive some information from an external object through wired or wireless communication. For example, the communication device 450 may receive a source image. The communication device 450 may transmit an encoded bitstream to an external object.

The computing device 430 refers to an element for processing given data or information. The computing device 430 may be a device, such as a processor, an application processor (AP), and a chip with an embedded program.

The computing device 430 may encode a multi-view image using code or a program stored in the storage device 410.

The computing device 430 may encode some images among the multi-view images by using a normal method.

The computing device 430 may encode a specific block of a specific-view image to be encoded on the basis of IBC.

In this case, the computing device 430 may determine a disparity vector for the specific block. When a texture image is encoded, the computing device 430 may determine a disparity vector using NBDV. Alternatively, when a depth image is encoded, the computing device 430 may determine a disparity vector using depth information.

The computing device 430 may determine a reference block of one reference image that has been coded among multi-view images using the disparity vector. When the reference block is encoded using IBC, the computing device 430 may determine block vector information for the IBC of the specific block on the basis of a first block vector of the reference block. The computing device 430 may encode block vector information of the specific block.

The block vector information may include at least one piece of information in an information group including a first block vector, a second block vector of a specific block predicted based on the first block vector, and a difference between the first block vector and the second block vector. The computing device 430 may determine the second block vector (IBC block vector) of the specific block, as described in operation 280 of FIG. 3.

The computing device 430 may determine, as the block vector of the specific block, a block vector with the highest encoding efficiency among a candidate vector group including the first block vector and candidate block vectors considered in an IBC skip/merge mode or an IBC AMVP mode for the specific block. This is the same as described in FIG. 4 and operation 280 of FIG. 3.

The computing device 430 may encode a first image of a layered image of a specific view among the multi-view images by using a normal method.

The computing device 430 may encode a specific block of a second image of the layered image of the specific view to be encoded on the basis of IBC. When the first image is a texture image, the second image is a depth image. When the first image is a depth image, the second image is a texture image.

The computing device 430 may determine a reference block (co-located block) of the first image corresponding to the specific block of the second image. When the reference block is encoded using IBC, the computing device 430 may determine block vector information for the IBC of the specific block on the basis of a first block vector of the reference block. The computing device 430 may encode block vector information of the specific block.

The block vector information may include at least one piece of information in an information group including a first block vector, a second block vector of a specific block predicted based on the first block vector, and a difference between the first block vector and the second block vector. The computing device 430 may determine the second block vector (IBC block vector) of the specific block, as described in operation 370 of FIG. 5.

The computing device 430 may determine, as the block vector of the specific block, a block vector with the highest encoding efficiency among a candidate vector group including the first block vector and candidate block vectors considered in an IBC skip/merge mode or an IBC AMVP mode for the specific block. This is the same as described in FIG. 6 and operation 370 of FIG. 5.

Figure 8:
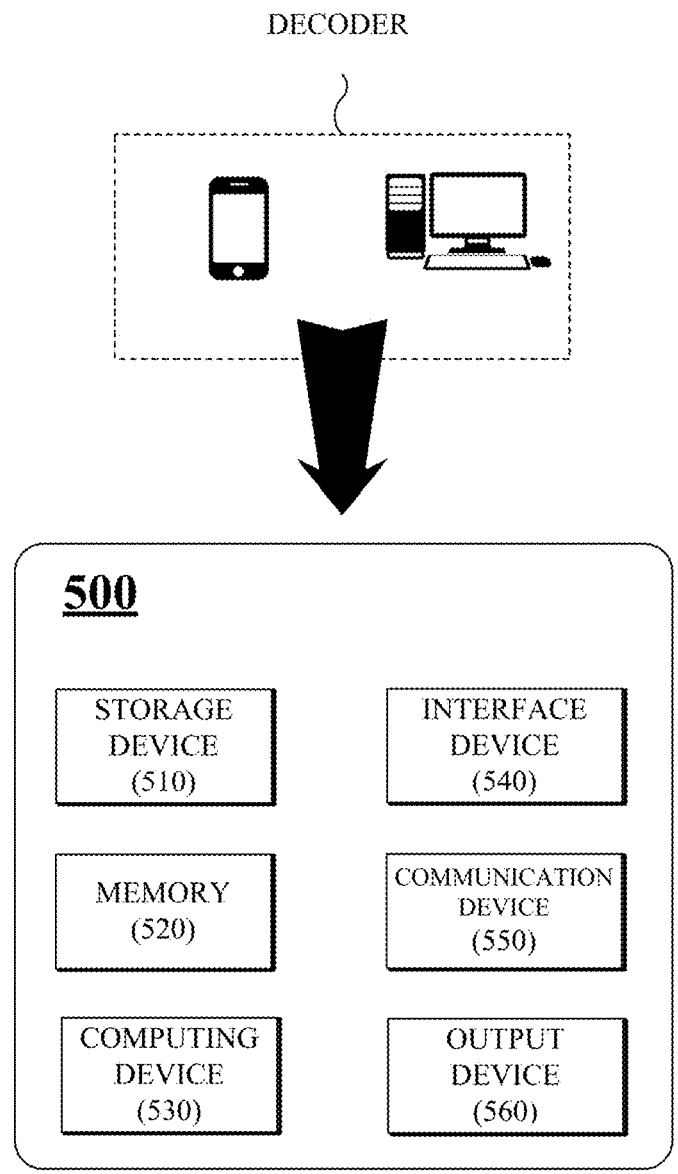
FIG. 8 is an example of a decoder corresponding to the encoder of FIG. 7.

FIG. 8 is an example of a decoder 500 corresponding to the encoder of FIG. 7. The decoder 500 may decode a bitstream coded by the encoder 400 into an image suitable for a service purpose. The decoder 500 may be implemented in the form of a computer device that processes an image, a user terminal, a smart device, a server, or a chipset that has an embedded decoding program.

The decoder 500 includes a storage device 510, a memory 520, a computing device 530, and an interface device 540. Furthermore, the decoder 500 may include a communication device 550 and an output device 560.

The storage device 510 may store a program for decoding a multi-view image. The storage device 510 may store a received bitstream.

The memory 520 may temporarily store information that is generated or necessary during a decoding process.

The interface device 540 refers to an element for transferring data and commands in the decoder. The interface device 540 may include a physical device and a communication protocol for internal communication. The interface device 540 may receive a bitstream. The interface device 540 may receive a command for decoding the bitstream.

The communication device 550 may receive some information from an external object through wired or wireless communication. For example, the communication device 550 may receive a bitstream. The communication device 550 may transmit a decoded image to an external object.

When the interface device 540 and the communication device 550 equally receive the bitstream from the external object, the interface device 540 and the communication device 550 may be referred to as input devices.

The computing device 530 refers to an element for processing given data or information. The computing device 530 may be a device, such as a processor, an application processor (AP), and a chip with an embedded program.

The computing device 530 decodes a multi-view image using code or a program stored in the storage device 510.

The computing device 530 may parse an input bitstream to extract an image required for decoding.

The computing device 530 may generate a multi-view image by decoding the bitstream and may synthesize an intermediate-view image using information of the generated image.

The computing device 530 may extract block vector information for decoding a specific block from the bitstream.

The computing device 530 may decode a first specific block of a specific-view image among multi-view images on the basis of a first reference block of a reference image that has been coded.

The computing device 530 may check whether the first reference block is encoded using IBC. When the first reference block is encoded using IBC, the computing device 530 may determine the first reference block using at least one piece of information in a block vector group including multiple block vectors or multiple blocks. The block vector group may include at least one piece of information in an information group including a first block vector of the first specific block, a second block vector of the first reference block, and a difference between the first block vector and the second block vector. The computing device 530 may perform IBC encoding on the first specific block using information of the determined first reference block.

The computing device 530 may check whether the first reference block is encoded using IBC. When the first reference block is encoded using IBC, the computing device 530 may determine the block vector of the first specific block using the block vector information. In this case, the block vector information may include any one of the block vector of the first reference block and candidate block vectors considered in the IBC skip/merge mode or the IBC AMVP mode for the first specific block. In this case, the computing device 530 may determine a specific block vector with the best effect from the block vector information as the block vector of the first specific block.

The computing device 530 may decode a second specific block of a first image included in a layered image of a specific view among multi-view images on the basis of a second reference block (co-located block), corresponding to the second specific block, of a second image included in the layered image. The layered image includes a texture image and a depth image. When the first image is a texture image, the second image is a depth image. When the first image is a depth image, the second image is a texture image.

The computing device 530 may check whether the second reference block is encoded using IBC. When the second reference block is encoded using IBC, the computing device 530 may determine the second reference block using at least one piece of information in a block vector group including multiple block vectors or multiple blocks. The block vector group may include at least one piece of information in an information group including a first block vector of the second specific block, a second block vector of the second reference block, and a difference between the first block vector and the second block vector. The computing device 530 may perform IBC encoding on the second specific block using information of the determined second reference block.

The computing device 530 may check whether the second reference block is encoded using IBC. When the second reference block is encoded using IBC, the computing device 530 may determine the block vector of the second specific block using the block vector information. In this case, the block vector information may include any one of the block vector of the second reference block and candidate block vectors considered in the IBC skip/merge mode or the IBC AMVP mode for the second specific block. In this case, the computing device 530 may determine a specific block vector with the best effect from the block vector information as the block vector of the second specific block.

The output device 560 may output a decoded image.

Also, the above-described block vector prediction method, encoding method, and decoding method may be implemented using a program (or application) including an executable algorithm that may be executed by a computer. The program may be stored and provided in a transitory or non-transitory computer-readable medium.

The non-transitory computer-readable medium refers to a medium that semi-permanently stores data and is readable by a device rather than a medium that temporarily stores data such as a register, a cache, and a memory. Specifically, the above-described various applications or programs may be stored and provided in a non-transitory computer-readable medium such as a compact disc (CD), a digital versatile disc (DVD), a hard disk, a Blu-ray disc, a Universal Serial Bus (USB), a memory card, a read-only memory (ROM), a programmable read-only memory (PROM), an erasable PROM (EPROM), an electrically EPROM (EEPROM), or a flash memory.

A transitory computer-readable medium refers to various RAMs such as a static RAM (SRAM), a dynamic RAM (DRAM), a synchronous DRAM (SDRAM), a double data rate SDRAM (DDR SDRAM), an enhanced SDRAM (ES-DRAM), a SyncLink DRAM (SLDRAM), and a Direct Rambus RAM (DRRAM).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi-view image decoder using intra block copy (IBC), the multi-view image decoder comprising:
   an input device configured to receive a bitstream for multi-view images;
   a storage device configured to store a program for performing IBC-based intra-prediction; and
   a computing device configured to extract block vector information for a specific block from the bitstream, determine a reference block used to encode the specific block using the block vector information, and decode the specific block using the reference block,
   wherein in response to the specific block being a first specific block of first specific-view image in the multi-view images, the computing device is configured to decode the first specific block of the first specific-view image on the basis of a first reference block of a reference image that has been coded in the multi-view images; and wherein in response to the specific block being a second specific block of a first layered image of second specific view image in the multi-view images, the computing device is configured to decode the second specific block of the second specific view image on the basis of a second reference block of a second layered image which corresponds to the second specific block of the first layered image, wherein when the first reference block is encoded using the IBC, the block vector information comprises at least one piece of information in an information group including a first block vector of the first specific block, a second block vector of the first reference block, and a difference between the first block vector and the second block vector, and the computing device determines the first reference block in the reference image using the at least one piece of information.

2. The multi-view image decoder of claim 1, wherein when the second reference block is encoded using the IBC, the block vector information comprises at least one piece of information in an information group including a first block vector of the second specific block, a second block vector of the second reference block, and a difference between the first block vector and the second block vector, and the computing device determines the second reference block in the second image using the at least one piece of information.

3. The multi-view image decoder of claim 1, wherein when the first reference block is encoded using the IBC, the block vector information further comprises one of a block vector of the first reference block and candidate block vectors considered in an IBC skip/merge mode or an IBC advanced motion vector prediction (AMVP) mode for the first specific block.

4. The multi-view image decoder of claim 1, wherein when the second reference block is encoded using the IBC, the block vector information comprises one of a block vector of the second reference block and candidate block vectors considered in an IBC skip/merge mode or an IBC advanced motion vector prediction (AMVP) mode for the second specific block.

5. The multi-view image decoder of claim 1, wherein in response to the first layered image being a first texture image, the second layered image is a first depth image which corresponds to the first texture image, and in response to the first layered image being a second depth image, the second layered image is a second texture image which corresponds to the second depth image.

6. The multi-view image decoder of claim 1, wherein the first reference block is determined by a disparity vector of the first specific block of first specific-view image.

* * * * *